United States Patent [19]

Komine

[11] Patent Number: 5,428,438
[45] Date of Patent: Jun. 27, 1995

[54] LASER RANGING AND DETECTION SYSTEM EMPLOYING A GEOMETRIC COHERENT/INCOHERENT BEAM SEPARATOR

[75] Inventor: Hiroshi Komine, Torrance, Calif.

[73] Assignee: Northrop Grumman Corporation, Los Angeles, Calif.

[21] Appl. No.: 115,361

[22] Filed: Aug. 30, 1993

[51] Int. Cl.⁶ .......................... G01C 3/08; G01P 3/36
[52] U.S. Cl. .......................... 356/5.01; 356/28.5; 359/528
[58] Field of Search .............. 356/5, 28.5; 359/528

[56] References Cited

U.S. PATENT DOCUMENTS

| | | | |
|---|---|---|---|
| 3,768,908 | 10/1973 | Zaromb | 356/103 |
| 3,968,362 | 7/1976 | Mocker | 250/216 |
| 3,984,685 | 10/1976 | Fletcher et al. | 250/339 |
| 3,984,686 | 10/1976 | Fletcher et al. | 250/339 |
| 4,154,529 | 5/1979 | Dyott | 356/28 |
| 4,311,384 | 1/1982 | Keene | 356/152 |
| 4,492,467 | 1/1985 | Drain et al. | 356/336 |
| 4,515,472 | 5/1985 | Welch | 356/5 |
| 4,559,445 | 12/1985 | Hedin et al. | 356/5 |
| 4,589,070 | 5/1986 | Kyrazis | 364/424 |
| 4,902,127 | 2/1990 | Byer et al. | 356/5 |
| 4,950,075 | 8/1990 | Ichinose et al. | 356/141 |
| 5,029,999 | 7/1991 | Kremer et al. | 356/5 |
| 5,035,506 | 7/1991 | Ouhayoun | 356/349 |
| 5,047,653 | 9/1991 | Garcia et al. | 250/574 |
| 5,098,185 | 3/1992 | Watanabe et al. | 356/5 |
| 5,141,312 | 8/1992 | Thompson et al. | 356/218 |

Primary Examiner—Stephen C. Buczinski
Attorney, Agent, or Firm—Terry J. Anderson; Karl J. Hoch, Jr.

[57] ABSTRACT

A laser ranging and detection system includes a laser for generating a coherent outgoing beam and a telescope. The telescope includes a primary mirror with an aperture for receiving the coherent outgoing beam and for passing an incoming, incoherent, backscattered light. A focal system is positioned between the laser and the telescope and focusses the coherent outgoing beam so as to create a reduced beam-waist cross section at a focal plane. A beam separator is positioned at the focal plane and in a first path between the focal system and the telescope. The beam separator includes a reflective surface arranged to reflect the incoherent backscattered light to a second path for detection. The beam separator further has an optical aperture positioned in the first path, that exhibits a cross sectional area approximately equal to the reduced beam-waist cross section. The size of the optical aperture is such that it enables the beam separator to reflect greater than 90 percent of incoming incoherent light to the detector.

6 Claims, 2 Drawing Sheets

LASER RANGING AND DETECTION SYSTEM EMPLOYING A GEOMETRIC COHERENT/INCOHERENT BEAM SEPARATOR

FIELD OF THE INVENTION

This invention relates to a laser ranging and detection system, and more particularly, to a laser ranging and detection system that employs a geometrical element for separating an outgoing coherent beam from an incoming incoherent backscattered light.

BACKGROUND OF THE INVENTION

Laser ranging and detection systems are known in the art and generally consist of a laser light source coupled to an optical transmission system for illuminating a target. A photodetector receives backscattered incoherent light from the target and provides a signal indicative thereof to a ranging processor. The transmission/receiving optical systems often share a common telescope to meet design and cost requirements.

Conventional methods for separation of an outgoing coherent laser beam and received, backscattered, incoherent light, employ either a partially transmissive/reflective beam splitter or polarizer systems. Both transmissive/reflective beam splitters and polarizer systems cause a loss of receiver efficiency due to light losses. Ordinarily, these efficiency losses are compensated by use of a more powerful laser or a larger telescope.

Beam separators are used in laser radar systems, laser doppler velocimeters, photoluminescence sensors and other devices which employ a laser beam to illuminate a target media. Each of those systems requires a means for separating the outgoing laser beam from returned reflection light. In U.S. Pat. No. 3,968,362 to Mocker, a roof prism reflector separates the beam paths of an illuminating source and a receiving detector. The roof prism reflector only reflects only up to half of the return light and feeds it to a detector.

In U.S. Pat. No. 5,098,185 to Watanabe et al., apparatus for beam splitting includes a parabolic reflector that includes an aperture through which a scanned laser beam is directed. The parabolic reflector is oriented at such an angle that a return beam is reflected off-axis to a receiver. The transmitted laser beam is scanned through the aperture in the reflector, requiring that the aperture be sufficiently large to allow passage of the scanned beam, without obstruction. The Watanabe et al. system employs a laser beam collimator which expands the beam size and maintains its cross section at a constant diameter over an extended distance. In practice, "collimated" beams typically have diameters approximately 1 millimeter or greater, otherwise, diffraction expands the beam diameter over a distance as short as one meter or less.

In U.S. Pat. No. 5,141,312 to Thompson et al., a photoluminescence sensor is illustrated that passes an incident laser beam through an aperture in a concave mirror to a microscope objective system that includes primary and secondary mirrors. The return beam is reflected off-axis by the concave mirror to a detector. Because Thompson et al. employ no means for reducing the cross section of the laser beam, a relatively large diameter aperture is required in the concave mirror for the outgoing beam, thereby reducing the amount of reflected light that can be directed to the detector.

Accordingly, it is an object of this invention to provide a laser ranging and detection system with an improved beam separation apparatus.

It is a further object of this invention to provide a laser ranging and detection system with a beam separator that enables greater than 90 percent of received incoherent light to be directed to a light detection system.

It is yet another object of this invention to provide a laser ranging and detection system with an improved geometric beam separator that enables the system to employ a single, aligned telescope with simple, inexpensive optics.

SUMMARY OF THE INVENTION

A laser ranging and detection system includes a laser for generating a coherent outgoing beam and a telescope. The telescope includes a primary mirror with an aperture for receiving the coherent outgoing beam and for passing an incoming, incoherent, backscattered light. A focal system is positioned between the laser and the telescope and focusses the coherent outgoing beam so as to create a reduced beam-waist cross section at a focal plane. A beam separator is positioned at the focal plane and in a first path between the focal system and the telescope. The beam separator includes a reflective surface arranged to reflect the incoherent backscattered light to a second path for detection. The beam separator further has an optical aperture positioned in the first path, that exhibits a cross sectional area approximately equal to the reduced beam-waist cross section. The size of the optical aperture is such that it enables the beam separator to reflect greater than 90 percent of incoming incoherent light to the detector.

DETAILED DESCRIPTION OF THE INVENTION

Figure 1:
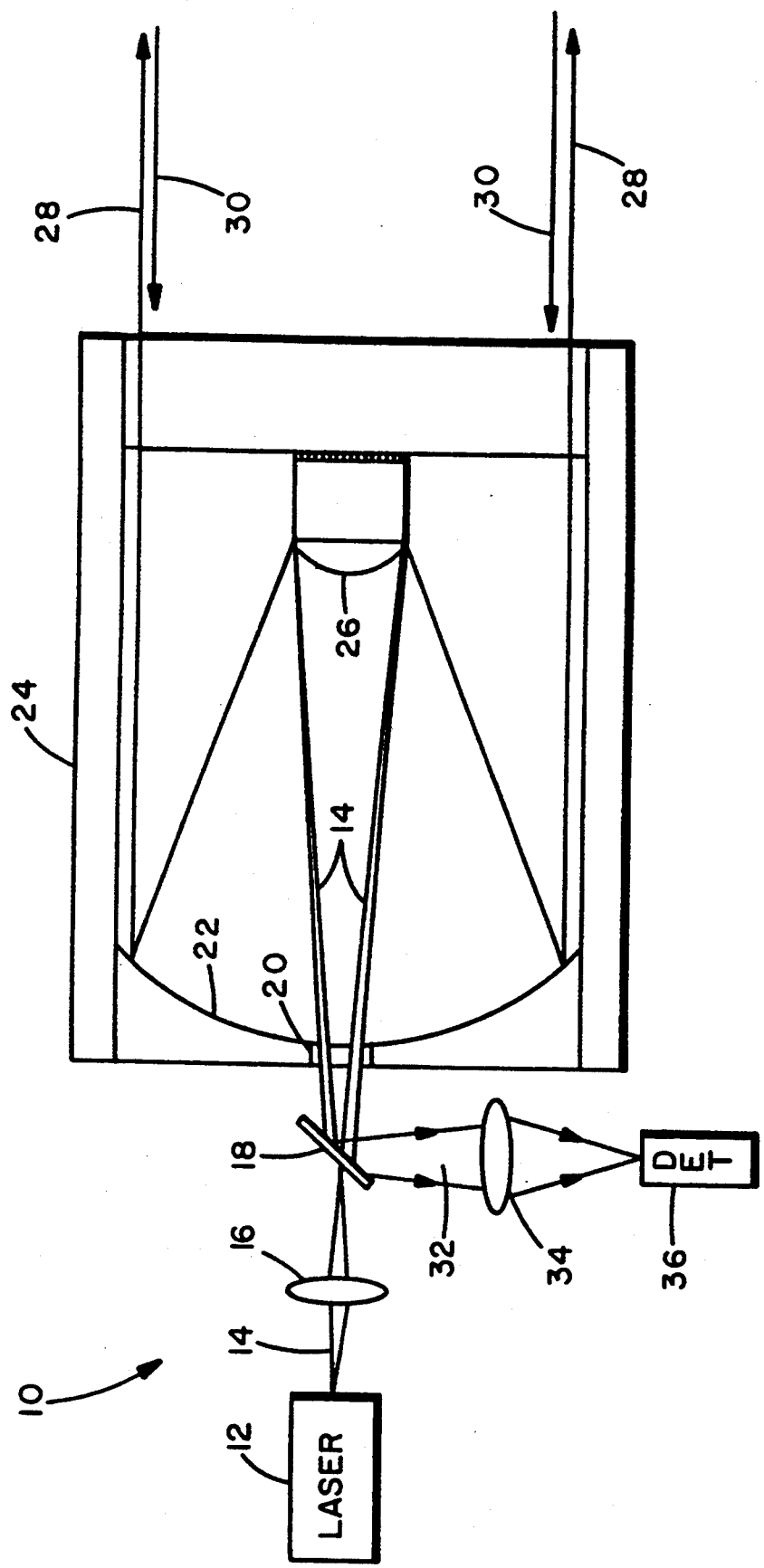
FIG. 1 is a schematic diagram of a laser ranging and detection system that incorporates the invention.

Referring to FIG. 1, a laser ranging and detection system 10 includes a laser 12 that directs a coherent beam 14 along a first path. Positioned along the first path is a focussing optic (or optics that include lenses, mirrors, and optical fibers) 16 and a beam separator 18. An aperture in beam separator 18 (not shown in FIG. 1) passes focussed laser beam 14 (from focussing optic 16) to an aperture 20 formed in a primary mirror 22 of telescope 24. Coherent laser beam 14 expands to encompass the surface of a secondary telescope mirror 26 which, in turn, reflects coherent beam 14 back to primary mirror 22. Beam 14 is then reflected outward in the direction indicated by arrows 28.

Backscattered light 30 differs from transmitted light 28 in that it is spatially incoherent and, as a result, the resulting image is blurred. Backscattered light 30 is reflected by primary mirror 22 onto secondary mirror 26 and then through aperture 20 to beam separator 18. The blurred image incident on beam separator 18 is much larger than the aperture in beam separator 18. As a result, a substantial portion of the backscattered light 30 (greater than 90 percent) is reflected along a second path 32, through a focussing optic 34, to a detector 36.

Figure 2:
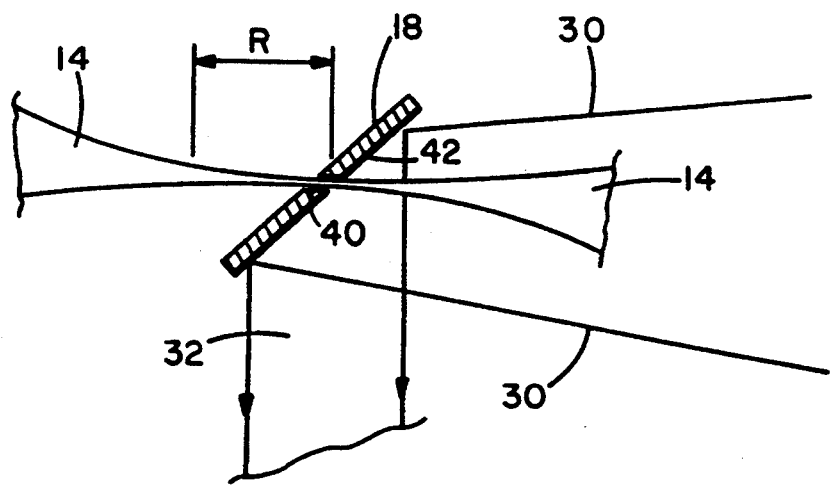
FIG. 2 is an expanded view of a beam separator employed in the system of FIG. 1.

In FIG. 2, an expanded view of beam separator 18 illustrates the positioning of an aperture 40 therein. Aperture 40 may either be a physical through-hole in beam separator 18 or may be a transparent, beam transmissive portion of beam separator 18. Surface 42 of beam separator 18 is coated to provide a mirrored surface for reflection of backscattered incoherent light 30 along second path 32. The cross sectional area of aperture 40 limits the amount of backscattered light reflected along second path 32 by a ratio of the cross sectional area of aperture 40 to the area of the back-scattered light on reflective surface 42.

To maximize the amount of reflected backscattered light, the cross sectional area of aperture 40 should be reduced to as small a cross section as possible, i.e. one that will just allow beam 14 to pass. Thus, focussing optic 16 (FIG. 1) is designed to provide a Rayleigh range R for coherent laser beam 14 that is small. Those skilled in the art will understand that the Rayleigh range of a coherent beam is a distance that a Gaussian beam propagates from its waist (or focus point) to a point where its beam area is twice the area of the beam waist. The shorter the Rayleigh range, the more tightly focussed the beam and the smaller the diameter of the beam waist. It is preferred that Rayleigh range R be one millimeter or less, for coherent laser beam 14. The diameter of aperture 40 is thus reduced to a minimal cross section, allowing passage of substantially all of the energy of focussed coherent laser beam 14, and subtracting only a minimal amount of reflected energy from backscattered light 30.

Beam separator 18 can thus be seen to operate upon geometrical principles that are related to the area of the back-scattered light on reflective region 42 in comparison to the cross sectional area of aperture 40. The operation of geometrical beam separator 18 is independent of polarization of either laser beam 14 and or backscattered light 30. Hence, polarizers and waveplate devices are eliminated and collection efficiency of the receiver optical train does not suffer the losses that are inherent therein.

Figure 3:
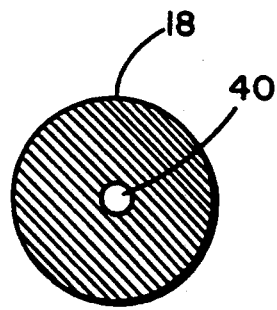
FIGS. 3–5 illustrate various aperture configurations for the beam separator of FIG. 2.
Figure 4:
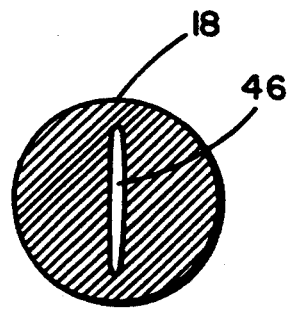
Figure 5:
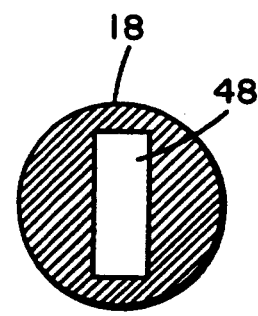

In FIG. 3, a plan view is shown of a beam separator 18 useful with a laser beam that is diffraction limited in two dimensions. A pin hole 40 provides an aperture for laser beam 14. FIG. 4 illustrates an elliptical slit 46 that may be employed for a one dimensional diffraction-limited laser beam. In FIG. 5, a rectangular slit 48 may be used for a laser beam that is nearly diffraction-limited in a single dimension.

The following are two examples of a laser ranging and detection system that employ a geometrical beam separator 18. In the first example, a diffraction-limited laser is employed and in the second example, a linear array of laser diodes are used. In each case, the laser wavelength is 850 nanometers. The laser ranging and detection system comprises a telescope with a primary mirror diameter of 15 centimeters and a focal length of 20 centimeters. The transmitted beam divergence and backscatter collection angles are 1 milliradian. The backscatter image size at beam separator 18 is approximately 200 microns.

In the first example, employing a diffraction-limited laser, the diffraction spot size is 1.13 microns. A pin-hole 40 with a diameter of about 3.54 microns is required to transmit focussed laser beam 14 without clipping the wings of the beam. The ratio of the size of pin-hole 40 to the image size is 0.017, and the calculated efficiency of the return beam focussed on detector 36 is 99.97 percent. If the pin-hole size is increased to 20 microns, the calculated efficiency drops to 99 percent.

In the second example, a diode-array laser is employed that emits a nearly diffraction-limited beam in one direction while the other direction diverges at an angle of approximately 10 degrees (assuming a 1 millimeter wide array). By expanding the beam to a 15 centimeter size, the divergence reduces to a design value of 1 milliradian. Beam separator 18, for this case, employs a 1 millimeter long slit 48. If the slit width is 20 microns, the calculated efficiency is 90 percent. A 10 micron slit improves the efficiency to 95 percent.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A laser ranging and detection system comprising:
    a laser for directing a coherent outgoing beam along a first path;
    telescope means positioned in said first path, for receiving said coherent outgoing beam and for passing incoherent backscattered light;
    focal means positioned between said laser and telescope means for focussing said coherent outgoing beam so as to create a reduced beam waist cross section at a focal plane; and
    beam separating means coincident with said focal plane and positioned in said first path between said focal means and said telescope means, said beam separating means including a reflective surface arranged to reflect said incoherent backscattered light to a second path and having an optical aperture in said first path, said optical aperture exhibiting cross section dimensions approximately equal to cross section dimensions of said reduced beam waist.

2. The laser ranging and detection system as recited in claim 1 wherein said optical aperture in said beam separating means is a physical hole through said beam separating means.

3. The laser ranging and detection system as recited in claim 1 wherein said optical aperture is an optically transmissive region in said beam separating means.

4. The laser ranging and detection system as recited in claim 1 wherein said telescope means comprises:
    a primary mirror for directing said coherent outgoing beam in the direction of a target and for reflecting said incoherent backscattered light, said primary mirror having an aperture positioned coincident with said first path, for receiving said coherent outgoing beam from said beam separating means; and
    a secondary mirror positionally opposed to said primary mirror, for reflecting said incoherent backscattered light through said aperture in said primary mirror and for reflecting said coherent outgoing beam received through said aperture back to said primary mirror.

5. The laser ranging and detection system as recited in claim 4 wherein said first path defines a straight line.

6. The laser ranging and detection system as recited in claim 1 wherein said coherent beam, at said reduced beam waist cross section, exhibits a Rayleigh distance of one millimeter or less.

* * * * *